US011337179B2

(12) United States Patent
Kalhan

(10) Patent No.: US 11,337,179 B2
(45) Date of Patent: *May 17, 2022

(54) CONTROL INFORMATION FROM MACROCELL TO NODE, MAPPING DATA BLOCKS TO UE ID

(71) Applicants: Amit Kalhan, San Diego, CA (US); Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/040,759

(22) PCT Filed: Apr. 23, 2019

(86) PCT No.: PCT/US2019/028639
§ 371 (c)(1),
(2) Date: Sep. 23, 2020

(87) PCT Pub. No.: WO2019/209780
PCT Pub. Date: Oct. 31, 2019

(65) Prior Publication Data
US 2021/0007078 A1    Jan. 7, 2021

Related U.S. Application Data

(60) Provisional application No. 62/682,095, filed on Jun. 7, 2018, provisional application No. 62/682,090, filed
(Continued)

(51) Int. Cl.
*H04W 72/00* (2009.01)
*G16Y 30/00* (2020.01)
(Continued)

(52) U.S. Cl.
CPC ........... *H04W 72/005* (2013.01); *G16Y 30/00* (2020.01); *G16Y 40/35* (2020.01); *H04B 7/155* (2013.01);
(Continued)

(58) Field of Classification Search
CPC ....... H04W 72/005; H04W 4/06; H04W 4/70; H04W 24/10; H04W 72/042;
(Continued)

(56) References Cited

U.S. PATENT DOCUMENTS 10,149,099 B2    12/2018  Kim et al.
2007/0098102 A1   5/2007  Hottinen
(Continued)

FOREIGN PATENT DOCUMENTS

EP       3229549 A1    10/2017
WO    2017030520 A1     2/2017

*Primary Examiner* — Walter J Divito

(57) ABSTRACT

A relay node receives a data block containing multiplexed data streams intended for multiple user equipment (UE) devices being served by the relay node. The relay node extracts the data streams from the data block and allocates them each to a separate narrowband channel that is associated with a particular UE device. The relay node repeatedly transmits the narrowband channels to the UE devices in a broadcast transmission that is transmitted for a predetermined number of repetitions. Each UE device decodes their own respective narrowband channel to obtain the data stream intended for the UE device associated with a particular narrowband channel. A feedback mechanism is utilized by the relay node to determine whether to retransmit a data packet or a new data packet in subsequent broadcast transmissions.

16 Claims, 9 Drawing Sheets

Related U.S. Application Data on Jun. 7, 2018, provisional application No. 62/682,081, filed on Jun. 7, 2018, provisional application No. 62/661,253, filed on Apr. 23, 2018.

(51) Int. Cl.
    *G16Y 40/35*     (2020.01)
    *H04W 4/08*     (2009.01)
    *H04W 84/18*     (2009.01)
    *H04B 17/318*     (2015.01)
    *H04B 7/155*     (2006.01)
    *H04L 1/08*     (2006.01)
    *H04L 43/16*     (2022.01)
    *H04W 24/10*     (2009.01)
    *H04W 72/04*     (2009.01)
    *H04L 1/18*     (2006.01)
    *H04L 5/00*     (2006.01)
    *H04L 12/18*     (2006.01)
    *H04W 48/12*     (2009.01)
    *H04W 4/70*     (2018.01)
    *H04L 1/00*     (2006.01)
    *H04W 4/06*     (2009.01)
    *H04W 84/04*     (2009.01)

(52) U.S. Cl.
    CPC ......... *H04B 17/318* (2015.01); *H04L 1/0035* (2013.01); *H04L 1/08* (2013.01); *H04L 1/1819* (2013.01); *H04L 1/1896* (2013.01); *H04L 5/0055* (2013.01); *H04L 12/1863* (2013.01); *H04L 43/16* (2013.01); *H04W 4/06* (2013.01); *H04W 4/08* (2013.01); *H04W 4/70* (2018.02); *H04W 24/10* (2013.01); *H04W 48/12* (2013.01); *H04W 72/042* (2013.01); *H04W 84/18* (2013.01); *H04L 2001/0097* (2013.01); *H04W 84/047* (2013.01)

(58) Field of Classification Search
    CPC ....... H04W 48/12; H04W 4/08; H04W 84/18; H04W 84/047; H04L 1/0035; H04L 1/08; H04L 43/16; H04L 1/1819; H04L 1/1896; H04L 5/0055; H04L 12/1863; H04L 2001/0097; H04L 5/0053; H04B 17/318; H04B 7/155; G16Y 30/00; G16Y 40/35
    See application file for complete search history.

(56) References Cited

U.S. PATENT DOCUMENTS

2018/0020493 A1     1/2018   Park
2019/0159018 A1*   5/2019   Basu Mallick ....... H04W 8/005

* cited by examiner

CONTROL INFORMATION FROM MACROCELL TO NODE, MAPPING DATA BLOCKS TO UE ID

CLAIM OF PRIORITY

The present application claims the benefit of priority to Provisional Application No. 62/661,253, entitled "Broadcast Based Relaying To The IOT Devices", filed Apr. 23, 2018, Provisional Application No. 62/682,081, entitled "CONTROL INFORMATION FROM MICROCELL TO NODE, MAPPING BLOCKS TO UE ID", filed Jun. 7, 2018, Provisional Application No. 62/682,090, entitled "MULTIUSER BROADCAST TRANSMISSION NODE", filed Jun. 7, 2018, and Provisional Application No. 62/682,095, entitled "METHOD OF DETERMINING NUMBER OF REPETITIONS FOR MULTIUSER BROADCAST IN IOT DEPLOYMENTS", filed Jun. 7, 2018, all of which are assigned to the assignee hereof and hereby expressly incorporated by reference in their entirety.

FIELD

This invention generally relates to wireless communications and more particularly to relaying signals between wireless communication stations.

BACKGROUND

The Internet of things (IoT) is the extension of Internet connectivity into physical devices and everyday objects. Embedded with electronics, Internet connectivity, and other forms of hardware (e.g., such as sensors), IoT devices can (1) communicate and interact with other devices over the Internet, and (2) be remotely monitored and controlled. The definition of IoT has evolved due to the convergence of multiple technologies, real-time analytics, machine learning, commodity sensors, and embedded systems. Traditional fields of embedded systems, wireless sensor networks, control systems, automation (including home and building automation), and others all contribute to enabling the Internet of things.

In some cases, IoT devices operate in deep coverage areas where the downlink received signal strength is very poor. In extreme scenarios, the received signal strength at the IoT device receiver could have a signal-to-noise ratio (SNR) as low as SNR=−14 dB. In such situations, relay nodes are deployed for transmissions to the hard-to-reach IoT devices. However, the relay nodes improve the received signal strength at the expense of higher complexity. The increase in complexity is a result of interference management (e.g., in-band relays) and the control signaling required to manage the base station-relay node downlink transmission and scheduling of the relay node-IoT device links.

SUMMARY

A relay node receives a data block containing multiplexed data streams intended for multiple user equipment (UE) devices being served by the relay node. The relay node extracts the data streams from the data block and allocates them each to a separate narrowband channel that is associated with a particular UE device. The relay node repeatedly transmits the narrowband channels to the UE devices in a broadcast transmission that is transmitted for a predetermined number of repetitions. Each UE device decodes their own respective narrowband channel to obtain the data stream intended for the UE device associated with a particular narrowband channel. A feedback mechanism is utilized by the relay node to determine whether to retransmit a data packet or a new data packet in subsequent broadcast transmissions.

DETAILED DESCRIPTION

The examples described herein utilize a Multiuser Broadcast Transmission (MBT) to serve the IoT devices. For example, a small cell node (e.g., relay node) uses MBT to transmit data to the IoT devices that are out of the reach of a macrocell node (e.g., base station). The MBT is a single broadcast transmission to a plurality of user equipment (UE) devices that contains data for each of the plurality of UE devices.

The MBT advantageously reduces the amount of control signaling required since the relay node does not, in some examples, utilize any channel-aware scheduling or channel quality feedback from the UE devices for the downlink transmissions. The reduced amount of control signaling and scheduler complexity results in a low-cost solution for both the small cell transmitter (e.g., relay node transmitter) and the UE device receivers. The small cell node performs Long-Term Evolution (LTE) Release-8 paging and IDLE mode procedures for the IoT UE devices such as transmitting the primary synchronization signal (PSS) and secondary synchronization signal (SSS) channels, physical broadcast shared channel (PBSCH), Paging, and System Information Block (SIB) messaging.

In other examples, a UE device may act as a relay node for other UE devices. The network (e.g., base station) may select the UE device that acts as the relay node, or the UE device may volunteer to act as the relay node for other UE devices.

In still other examples, dual-connectivity (DC) could be used with the macrocell base station as the primary cell and the small cell node as the secondary cell. In the DC example, the macrocell node (e.g., base station) handles the basic paging and IDLE mode operations, and when ready, the UE devices switch to CONNECTED mode to transmit/receive data on the secondary cell, which is provided by the small cell node. Although MBT is feasible in the DC mode, the majority of the examples described herein will refer to the small cell node as the relay node.

Figure 1:
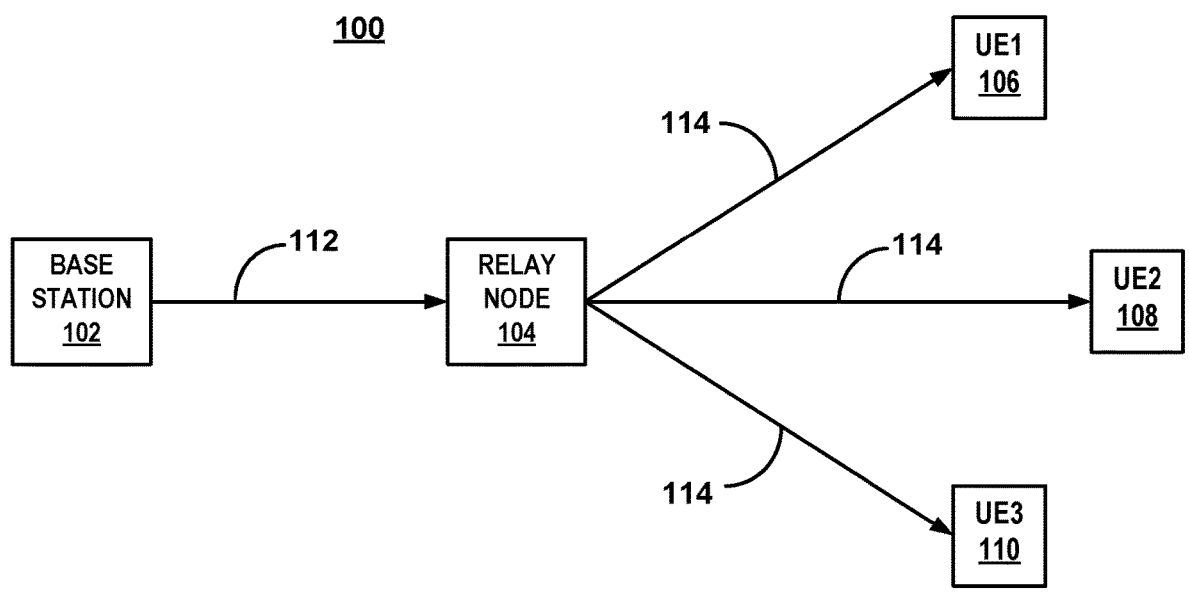
FIG. 1 is a block diagram of a communication system for an example in which a relay node is used to broadcast data streams to a plurality of user equipment (UE) devices.

FIG. 1 is a block diagram of a communication system for an example in which a relay node is used to broadcast data streams to a plurality of user equipment (UE) devices. Communication system 100 is part of a radio access network (not shown) that provides various wireless services to UE devices that are located within the respective service areas of the various base stations that are part of the radio access network. For the examples herein, communication system 100 operates in accordance with at least one revision of the 3rd Generation Partnership Project Long Term Evolution (3GPP LTE) communication specification.

In the interest of clarity and brevity, communication system 100 is shown as having only base station 102. However, in other examples, communication system 100 could have any suitable number of base stations. Base station 102, sometimes referred to as eNodeB or eNB, communicates with user equipment (UE) devices 106, 108, 110 via relay node 104. For example, base station 102 transmits data to relay node 104 via downlink signal 112, and relay node 104 broadcasts the data to UE devices 106, 108, 110 via signal 114. UE devices 106, 108, 110 are any wireless communication devices such as a mobile phone, a transceiver modem, a personal digital assistant (PDA), or a tablet, for example. Although not explicitly shown in FIG. 1, base station 102 may also receive uplink signals from relay node 104 and/or from UE devices 106, 108, 110.

Figure 2A:
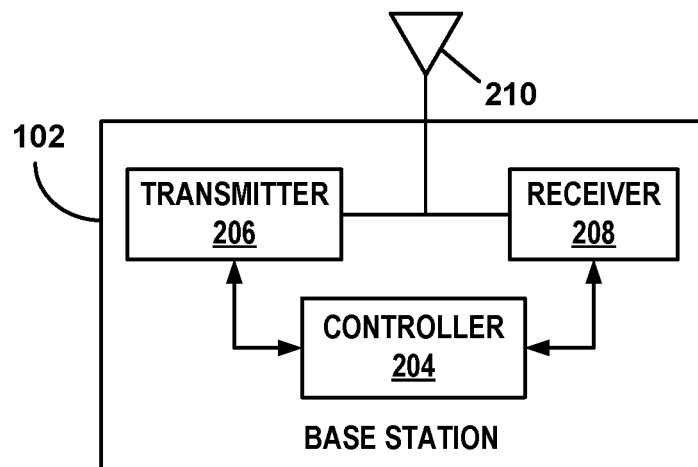
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of the downlink signal 112 and can apply any one of a plurality of modulation orders. The demodulator demodulates any uplink signals received at base station 102 in accordance with one of a plurality of modulation orders.

As mentioned above, base station 102 provides various wireless services to UE devices 106, 108, 110 via relay node 104. For example, base station 102 transmits data to relay node 104 via downlink signal 112, and relay node 104 broadcasts the data to UE devices 106, 108, 110 via signal 114. The relay node 104 is sometimes referred to as a relay or as a small cell node.

Figure 2B:
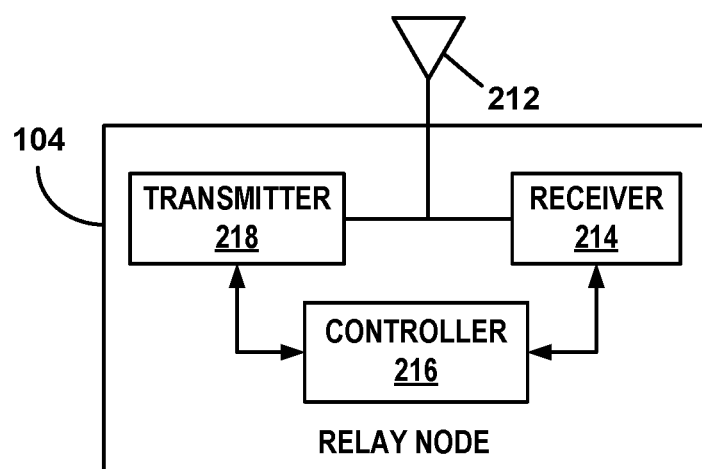
FIG. 2B is a block diagram of an example of the relay node shown in FIG. 1.

As shown in FIG. 2B, relay node 104 comprises controller 216, transmitter 218, and receiver 214, as well as other electronics, hardware, and code. Relay node 104 is any fixed, mobile, or portable equipment that performs the functions described herein. The various functions and operations of the blocks described with reference to relay node 104 may be implemented in any number of devices, circuits, or elements. Two or more of the functional blocks may be integrated in a single device, and the functions described as performed in any single device may be implemented over several devices.

For the example shown in FIG. 2B, relay node 104 may be a fixed device or apparatus that is installed at a particular location at the time of system deployment. Examples of such equipment include fixed base stations or fixed transceiver stations. In some situations, relay node 104 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, relay node 104 may be a portable device that is not fixed to any particular location. Accordingly, relay node 104 may be a portable user device such as a UE device in some circumstances.

Controller 216 includes any combination of hardware, software, and/or firmware for executing the functions described herein as well as facilitating the overall functionality of relay node 104. An example of a suitable controller 216 includes code running on a microprocessor or processor arrangement connected to memory. Transmitter 218 includes electronics configured to transmit wireless signals. In some situations, transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the base station functions. The required components may depend on the particular functionality required by the base station.

Transmitter 218 includes a modulator (not shown), and receiver 214 includes a demodulator (not shown). The modulator modulates the signals to be transmitted as part of the broadcast signal 114 and can apply any one of a plurality of modulation orders. The demodulator demodulates any uplink signals received at relay node 104 in accordance with one of a plurality of modulation orders.

Figure 2C:
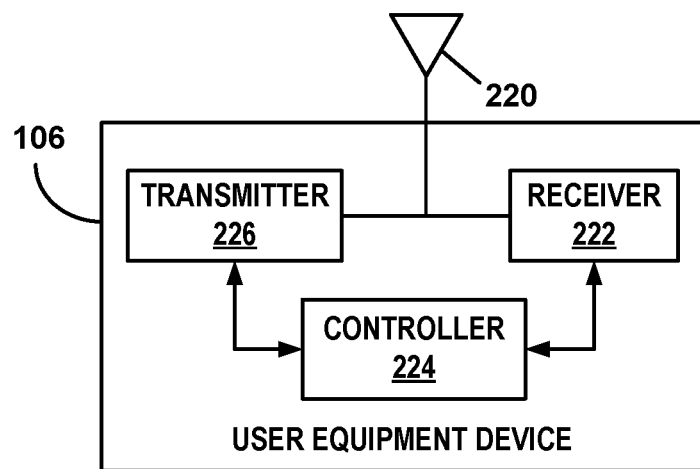
FIG. 2C is a block diagram of an example of the UE devices shown in FIG. 1.

As shown in FIG. 2C, UE devices 106, 108, 110 utilize their respective antennas 220 and receivers 222 to receive downlink signals 114 from relay node 104. Besides antenna 220 and receiver 222, UE device 106 (UE1) further comprises controller 224 and transmitter 226, as well as other electronics, hardware, and code. Although FIG. 2C specifically depicts the circuitry and configuration of UE device 106, the same UE device circuitry and configuration is utilized for UE devices 108, 110 in communication system 100. UE device 106 is any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

Controller 224 includes any combination of hardware, software, and/or firmware for executing the functions described herein as well as facilitating the overall functionality of a UE device. An example of a suitable controller 224 includes code running on a microprocessor or processor arrangement connected to memory. Transmitter 226 includes electronics configured to transmit wireless signals. In some situations, the transmitter 226 may include multiple transmitters. Receiver 222 includes electronics configured to receive wireless signals. In some situations, receiver 222 may include multiple receivers. Receiver 222 and transmitter 226 receive and transmit signals, respectively, through antenna 220. Antenna 220 may include separate transmit and receive antennas. In some circumstances, antenna 220 may include multiple transmit and receive antennas.

Transmitter 226 and receiver 222 in the example of FIG. 2C perform radio frequency (RF) processing including modulation and demodulation. Receiver 222, therefore, may include components such as low noise amplifiers (LNAs) and filters. Transmitter 226 may include filters and amplifiers. Other components may include isolators, matching circuits, and other RF components. These components in combination or cooperation with other components perform the UE device functions. The required components may depend on the particular functionality required by the UE device.

Transmitter 226 includes a modulator (not shown), and receiver 222 includes a demodulator (not shown). The modulator can apply any one of a plurality of modulation orders to modulate the signals to be transmitted as uplink signals (not shown). The demodulator demodulates the downlink signals 114 in accordance with one of a plurality of modulation orders.

In operation, base station 102 transmits, via transmitter 206 and antenna 210, downlink signal 112 to relay node 104. Downlink signal 112 contains control information and a block of data assigned to UE devices 106, 108, 110. In the example shown in FIG. 1, the block of data includes data intended for UE devices 106, 108, 110 that is multiplexed (e.g., combined) together to form a single signal 112. In some examples, the control information is a bitmap.

Relay node 104 receives downlink signal 112 via antenna 212 and receiver 214. The control information helps relay node 104 identify UE devices 106, 108, 110 and match them to their respective data streams. More specifically, relay node 104 uses the control information to (1) extract the data stream for each of UE devices 106, 108, 110 from the block of data contained in downlink signal 112, and (2) assign each data stream to a narrowband channel, resulting in a frequency-division multiplexing (FDM)-based resource allocation.

Figure 2D:
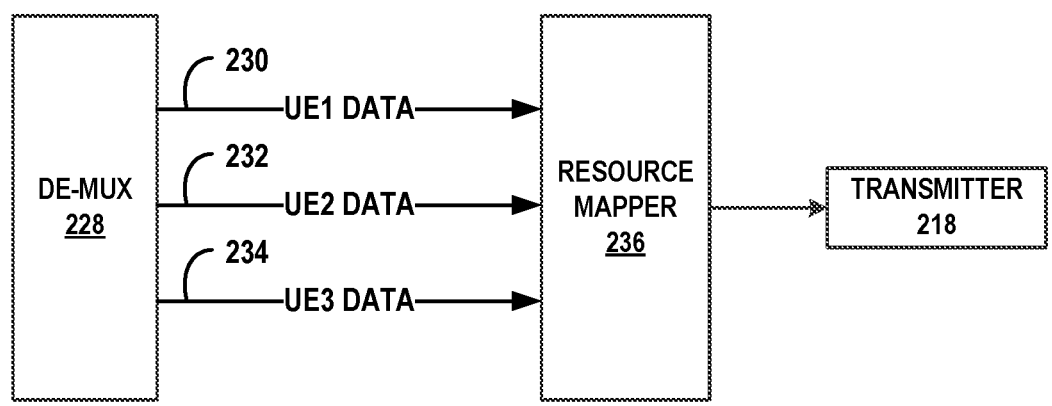
FIG. 2D is a block diagram of an example of the circuitry utilized within the relay node shown in FIG. 1.

For example, as shown in FIG. 2D, relay node 104 includes demultiplexer 228, which is used in combination with receiver 214 of relay node 104 and the control information received from base station 102, to (1) separate the multiplexed block of data contained in downlink signal 112 into separate data streams intended for each of UE devices 106, 108, 110, and (2) match each of the separated (e.g. extracted) data streams to a particular UE device. As shown in FIG. 2D, the product of demultiplexer 228 is first data stream 230 that is matched to UE1 106, second data stream 232 that is matched to UE2 108, and third data stream 234 that is matched to UE3 110. The functionality of demultiplexer 228 is performed by controller 216 in the example shown in FIG. 2D. However, in other examples, the functionality of demultiplexer 228 may be performed by any other suitable circuitry.

The separated data streams 230, 232, 234 are sent to resource mapper 236, which maps (e.g., assigns) each of the separated data streams 230, 232, 234 to a narrowband channel. In order to serve UE devices 106, 108, 110, relay node 104 splits the downlink bandwidth of signal 114 into a number of narrowband channels, for example, each consisting of six resource blocks in the frequency domain, as specified in LTE-Machine Type Communication (LTE-M)

Release-12. In some examples, space-division multiplexing (SDM) and/or frequency-hopping schemes on top of FDM can be applied to each narrowband signal. In other examples, time-division multiplexing (TDM) or code-division multiplexing (CDM) may be used instead of SDM. At the physical layer level, each UE-specific narrowband channel is allocated (e.g., assigned) a set of subcarriers within the portion of downlink channel bandwidth.

Relay node 104 transmits, via transmitter 218 and antenna 212, control information to UE devices 106, 108, 110, which are configured to use the control information to receive their respective data streams. In the examples described herein, there are two methods to deliver the downlink control information (DCI) to UE devices 106, 108, 110. The DCI parameters common to all UE devices 106, 108, 110 are delivered using the Common Search Space Machine-Type Communication Physical Downlink Control Channel (CSS-MPDCCH) or SIB messaging. The second method is to send the DCI using the UE-specific search space (USS) MPDCCH or to embed the DCI within a data packet in broadcast transmission 114.

The resource allocation (e.g., assignment) information, the modulation and coding scheme (MCS), and the transmission mode information for the multiuser broadcast transmission 114 are semi-static and can be announced to all targeted UE devices 106, 108, 110 before beginning data transmission since these parameters are kept the same during the transmission of multiple data blocks. For example, after receiving the block of data from base station 102 and determining $N_{rep}$, relay node 104 transmits control information regarding the resource assignment information, the MCS, the $N_{rep}$, and the transmission mode information (e.g., transmit diversity parameters, etc.) to UE devices 106, 108, and 110 using the CSS-MPDCCH or SIB messaging.

As mentioned above, the control information transmitted to UE devices 106, 108, 110 may include, for example, one or more of the following: a predetermined number of repetitions (e.g., times) that the broadcast transmission 114 will be transmitted, a modulation and coding scheme, resource allocation (e.g., assignment) information, transmission mode information, and feedback process information. In some examples, the control information is transmitted in a System Information Block (SIB) message. In other examples, the control information is transmitted on a Common Search Space Machine-Type Communication Physical Downlink Control Channel (CSS-MPDCCH). For example, UE devices 106, 108, 110 are informed about the resource assignment information (e.g., which narrowband channel contains the data stream for which UE device and/or which subcarriers are associated with each narrowband channel) via control information signaling (e.g. MPDCCH).

Once UE devices 106, 108, 110 are informed about the resource assignment information and/or other control information, relay node 104 transmits a broadcast transmission 114 to UE devices 106, 108, 110 via transmitter 218 and antenna 212. The broadcast transmission 114 contains the data stream for each of UE devices 106, 108, 110 in a separate narrowband channel. Although each of UE devices 106, 108, 110 will receive the same multiuser broadcast transmission (MBT) 114 from relay node 104, each UE device 106, 108, 110 will use its own respective narrowband receiver, which may be integrated into receiver 222, to access (e.g., receive and decode) the portion of the received downlink signal 114 that contains the narrowband channel that has been assigned to that particular UE device.

To achieve robustness, relay node 104 transmits broadcast transmission 114 for a predetermined number of repetitions using multi-subframe repetition, as defined in LTE-M Release-12. In IoT deployments, the data is repeatedly transmitted over multiple subframes to achieve robustness at the expense of higher latency. In some examples, the predetermined number of repetitions is a default number of repetitions. In other examples, the predetermined number of repetitions is determined.

Figure 3:
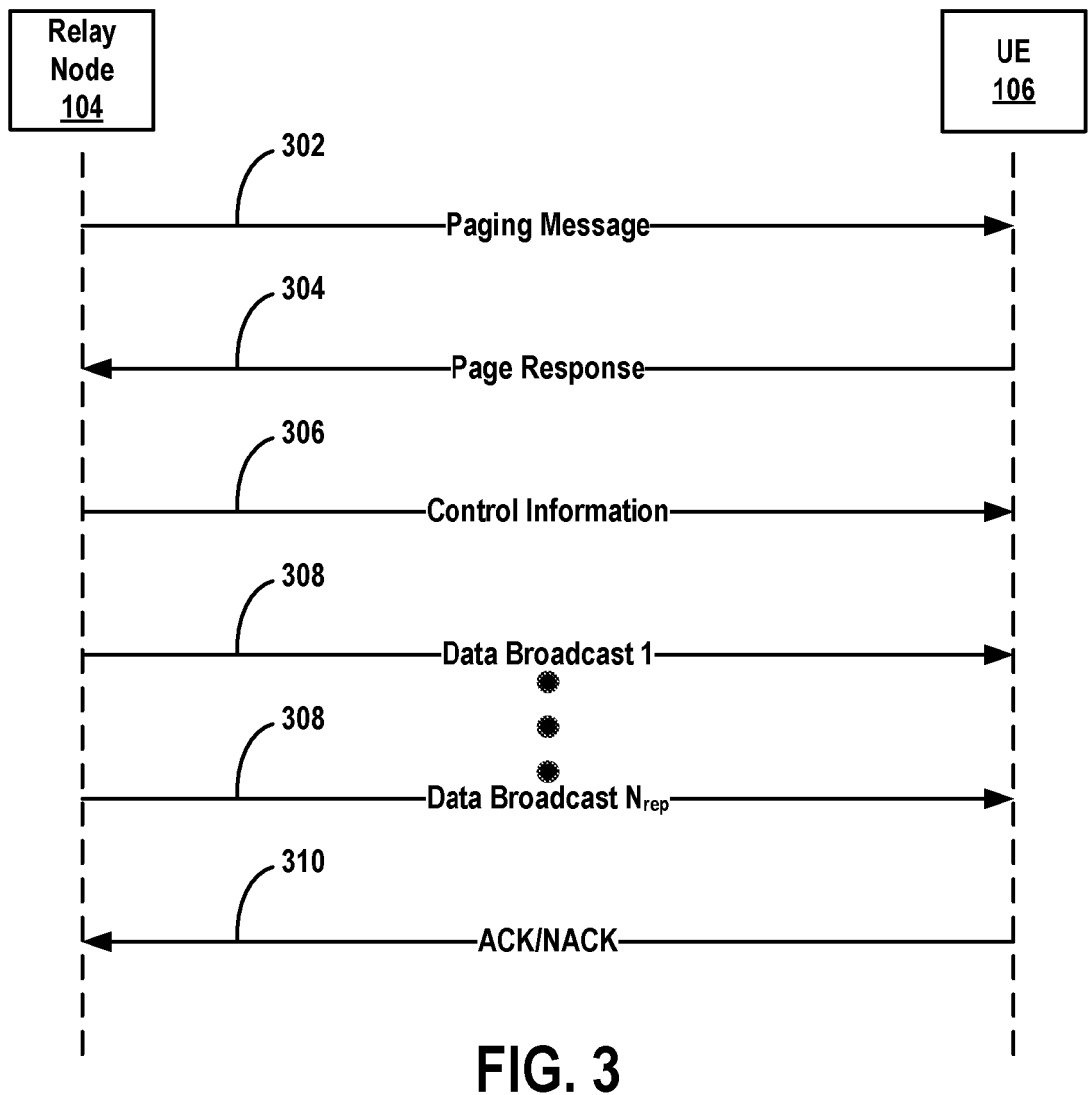
FIG. 3 is a messaging diagram of an example of the messages exchanged between the relay node and UE devices when determining a predetermined number of repetitions to transmit the broadcast transmission to the UE devices.

FIG. 3 is a messaging diagram of an example of the messages exchanged between relay node 104 and UE devices 106, 108, 110 when determining a predetermined number of repetitions, $N_{rep}$, to transmit broadcast transmission 114 to UE devices 106, 108, 110. In some examples, the predetermined number of repetitions, $N_{rep}$, is computed based on the worst received signal strength reported by UE devices 106, 108, 110. As shown in FIG. 3, relay node 104 transmits, via transmitter 218 and antenna 212, paging message 302 to all UE devices 106, 108, 110 listed in the block of data received from base station 102. In the example shown in FIG. 3, relay node 104 uses the common search space (CSS) MPDCCH to page UE devices 106, 108, 110. In other examples, the UE devices 106, 108, 110 periodically monitor the downlink signal 114 and may receive data at a predetermined subframe (e.g., in polling scheduler deployments).

In some examples, paging message 302 includes a request for UE devices 106, 108, 110 to each submit downlink measurement reports to relay node 104, based on their respectively measured received signal strength of broadcast transmission 114. In other examples, paging message 302 includes a request for UE devices 106, 108, 110 to each submit downlink measurement reports to relay node 104, if their received signal strength measurement value γ, is below a threshold value $γ_t$. In response to paging message 302, one or more of UE devices 106, 108, 110 transmit their respective page response 304 using their assigned Physical Uplink Control Channel (PUCCH) resources.

In some examples, one or more of the page responses 304 may include a downlink measurement report. In order to obtain exactness in some examples, UE devices 106, 108, 110 include a quantized worseness of the received signal strength compared to one or more threshold values, $γ_t$, in the downlink measurement report. For example, if a UE device is experiencing received signal strength below a first threshold value, $γ_{t1}$, then the UE device reports back a threshold index value of '1', and if the received signal strength is below first and second threshold values, $γ_{t1}$ and $γ_{t2}$, then the UE device reports a threshold index value of '2' and so on. Alternatively, if a UE device is experiencing received signal strength up to 0.5 dB (e.g., within a first range) below $γ_t$, then the UE device reports back a range index value of '1', and if the received signal strength is between 1 dB and 0.5 dB (e.g., within a second range) below $γ_t$, then the UE device reports a range index value of '2' and so on.

Thus, in light of the foregoing, the downlink measurement report may include one or more of the following: a received signal strength measurement value, γ; a first threshold index value that indicates that a received signal strength measurement value, γ, is below a first threshold value; a second threshold index value that indicates that a received signal strength measurement value, γ, is below a first threshold value and a second threshold value; a first range index value that indicates that a received signal strength measurement value, γ, is within a first range of values below a first threshold value; and a second range index value that indicates that a received signal strength measurement value, γ, is within a second range of values below a first threshold value.

Based on the number of UE devices 106, 108, 110 that report back the condition $\gamma < \gamma_t$ and their reported index value, relay node 104 utilizes controller 216 to determine the value of $N_{rep}$. With this approach, the value of $N_{rep}$ becomes a function of the number of UE devices 106, 108, 110 reporting $\gamma < \gamma_t$ and their respective reported index values.

After the value of $N_{rep}$ is decided (e.g, by default or determined by relay node 104), relay node 104 transmits control information 306 to be used for the multiuser broadcast transmissions 114 to all UE devices 106, 108, 110. As mentioned above, this control information 306 may include, for example, one or more of the following: a predetermined number of repetitions (e.g., $N_{rep}$) that the broadcast transmission 114 will be transmitted, a modulation and coding scheme, resource allocation (e.g., assignment) information, transmission mode information, and feedback process information. In some examples, the control information is transmitted in a System Information Block (SIB) message. In other examples, the control information is transmitted on a Common Search Space Machine-Type Communication Physical Downlink Control Channel (CSS-MPDCCH). In still other examples, the control information is transmitted in a data packet of broadcast transmission 114. In further examples, the control information is transmitted on a UE-specific Search Space Machine-Type Communication Physical Downlink Control Channel (USS-MPDCCH). The resource allocation information and the value of $N_{rep}$ can be transmitted semi-statically to UE devices 106, 108, 110 and are not required to be transmitted again until there is a change in the resource allocation or the predetermined number of repetitions.

Regardless of the manner in which the predetermined number of repetitions is determined, relay node 104 transmits, via transmitter 218 and antenna 212, broadcast transmission 114 (e.g., signal 308) for the predetermined number of repetitions, $N_{rep}$. UE devices 106, 108, 110 utilize the control information 306 to receive the repeated broadcast transmissions 114 and combine the energy received in each subframe to achieve a higher energy per bit, resulting in a higher successful detection rate. After receiving all $N_{rep}$ subframes of data, each UE device 106, 108, 110 transmits feedback message 310 to relay node 104 using a Physical Uplink Control Channel (PUCCH) or a Physical Uplink Shared Channel (PUSCH). Relay node 104 receives feedback message 310 via antenna 212 and receiver 214. In the example shown in FIG. 3, feedback message 310 is either an ACK or a NACK signal.

Figure 4:
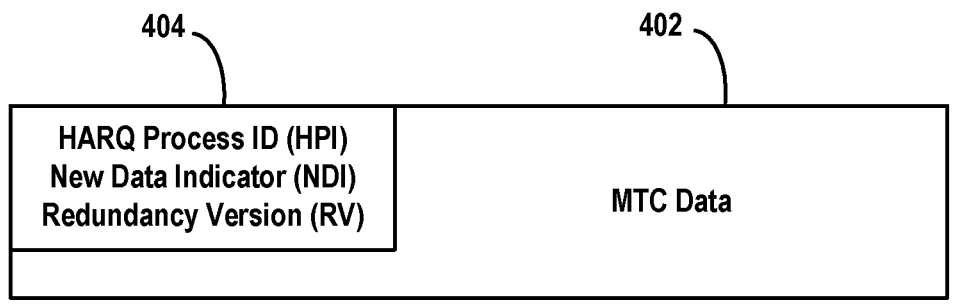
FIG. 4 is a block diagram of an example of a data packet with embedded feedback process information.

In some examples, Hybrid Automatic Repeat Request (HARQ) feedback is used in connection with the multiuser broadcast transmissions 114 to achieve higher detection performance. To handle the HARQ processes assigned to a particular UE device, HARQ process information 404 such as a HARQ Process Identifier (ID) (HPI), a New Data Indicator (NDI), and a Redundancy Version (RV) is embedded in the data packet 402 itself, as shown in FIG. 4. After receiving the narrowband channel data packet, each UE device 106, 108, 110 decodes the HARQ process information 404 before decoding the data in the data packet 402. This allows each UE device 106, 108, 110 to monitor and track its own respective HARQ process information.

In some examples, the UE device waits to receive all the repetitions (e.g., $N_{rep}$) of the broadcast transmission 114 before attempting to decode the packet. In other examples, the UE device may attempt to decode the packet after receiving any number of repetitions or after receiving each repetition. Depending on the decoding success, the UE device sends either an ACK or a NACK feedback message to relay node 104. If the UE device is successfully able to decode the packet before receiving all of the repetitions, the UE device could send an early termination ACK. If the feedback message is an ACK, relay node 104 transmits a new data packet (and a New Data Indicator) in the next transmission. If the feedback message is a NACK, relay node 104 transmits a next Redundancy Version packet (and an associated Redundancy Version (RV) value) in the next transmission. As a consequence of using this HARQ process for different UE devices 106, 108, 110 within the same multiuser broadcast transmission 114, the RV of the data packets addressed to different UE devices 106, 108, 110 could be different. Thus, relay node 104 is responsible for managing the HARQ processes for each of UE devices 106, 108, 110.

Since multiple UE devices 106, 108, 110 are served with the multiuser broadcast transmission 114, the PUCCH capacity may not be enough to transmit the large number of ACK/NACK feedback messages. Thus, in some examples, UE devices 106, 108, 110 are allowed to transmit their ACK/NACK feedback messages on PUSCH resources. In some examples, the amount of feedback signaling can be reduced if the UE devices 106, 108, 110 only transmit a NACK if they are unable to decode the data packet after receiving all of the repetitions (e.g., $N_{rep}$).

Figure 5:
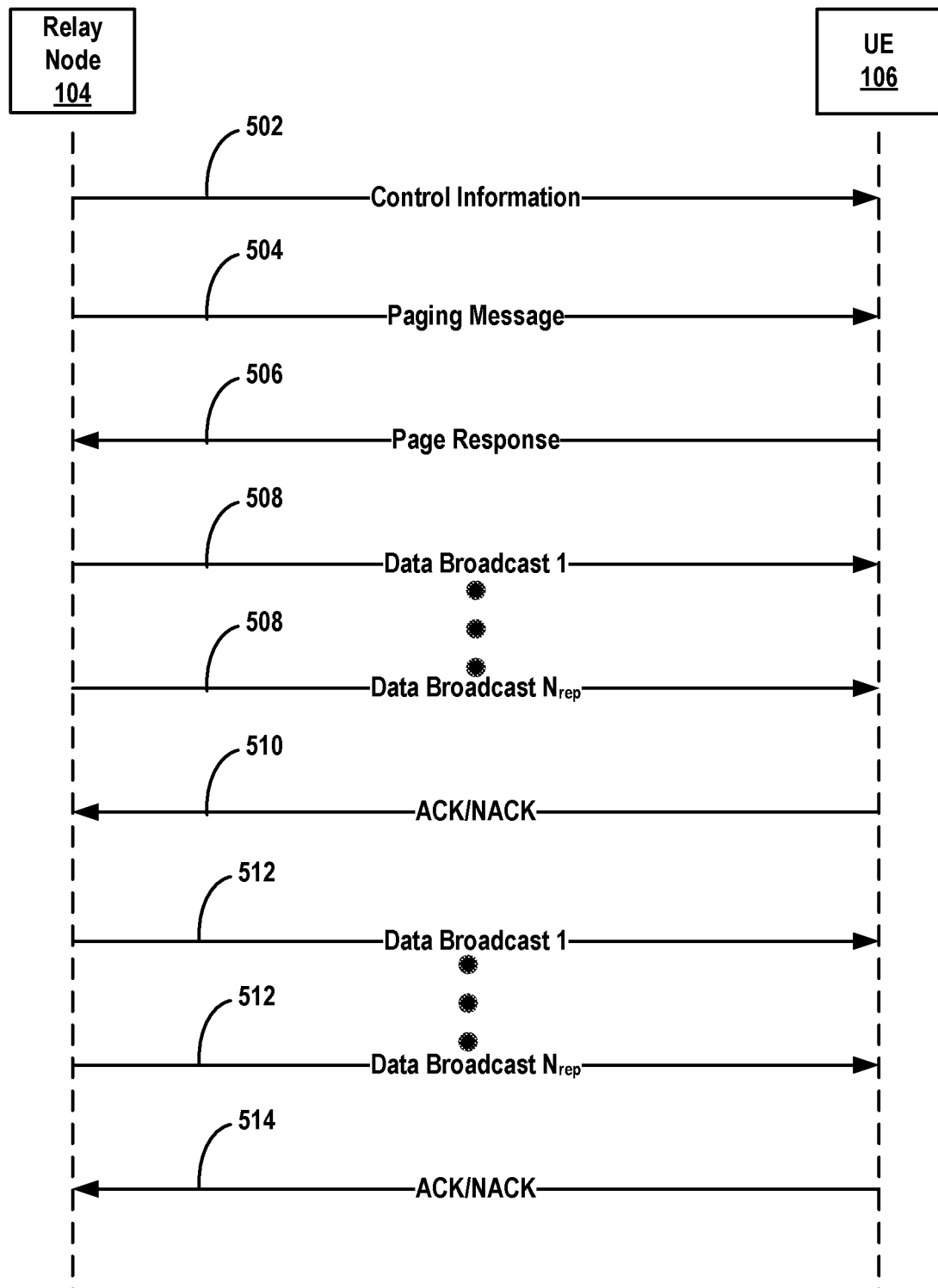
FIG. 5 is a messaging diagram of an example of the messages exchanged between the relay node and UE devices when utilizing a default predetermined number of repetitions to transmit the broadcast transmission to the UE devices.

FIG. 5 shows the signaling flows when a default MCS and a default $N_{rep}$ are used for the multiuser broadcast transmission 114. The use of a default MCS and a default $N_{rep}$ for the multiuser broadcast transmission 114 reduces the amount of control signaling required. For example, relay node 104 announces the default MCS value and the default $N_{rep}$ value periodically to all UE devices 106, 108, 110 using SIB messaging (e.g., control information 502). After the block of data is received from base station 102, relay node 104 allocates (e.g., assigns) the narrowband channels to UE devices 106, 108, 110 and transmits those assignments to the respective UE devices 106, 108, 110 in the page messages 504 transmitted to UE devices 106, 108, 110. UE devices 106, 108, 110 transmit page responses 506 on granted PUSCH resources. In other examples, the page messages 504 are not required if UE devices 106, 108, 110 are already periodically scheduled (e.g., by a polling scheduler) to monitor the data channel 114 to receive the narrowband channel assignments.

Relay node 104 transmits broadcast transmission 508 for the default number of repetitions, $N_{rep}$. UE devices 106, 108, 110 transmit feedback messages 514 to relay node 104 on granted PUSCH resources. Based on the received feedback messages 514, relay node 104 places either a new data packet or a next Redundancy Version packet on the assigned narrowband channel for each UE device 106, 108, 110. Unless one or more UE devices 106, 108, 110 report back a worse channel condition $\gamma < \gamma_t$, relay node 104 avoids transmitting the MPDCCH. The MPDCCH is only transmitted to provide the new non-default values of the MCS and/or $N_{rep}$.

There are several advantages to the examples described herein. For example, as mentioned above, the examples described herein do not require a complex channel-aware scheduler and do not require frequent individual Channel State Information (CSI) feedback from the UE devices 106, 108, 110. This significantly reduces the complexity of relay node 104 and reduces the control signaling overhead. In addition, the multiuser broadcast transmissions 114 from the near-located relay node 104 allow for a reduced number of required repetitions, $N_{rep}$, achieving further efficiency.

Figure 6:
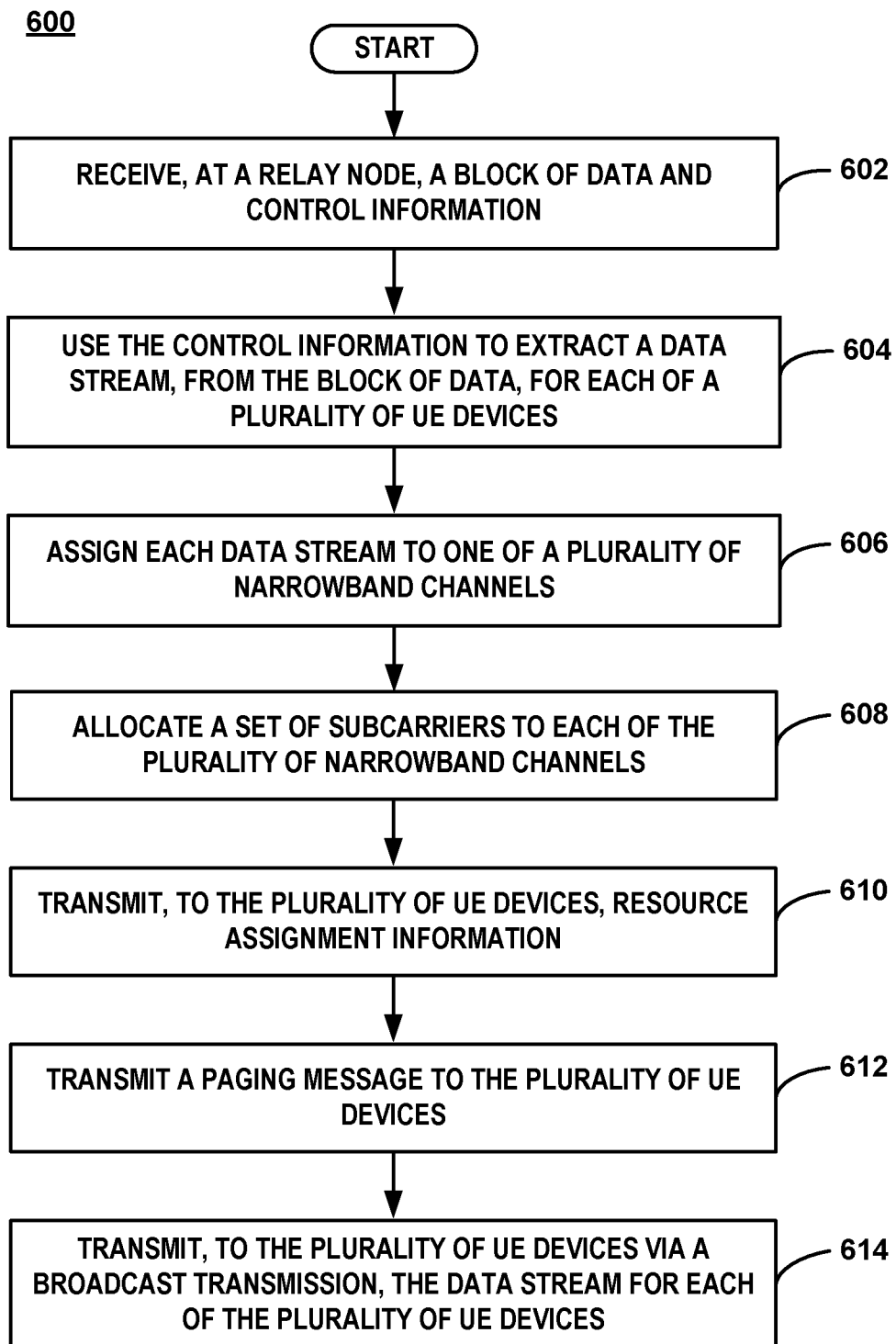
FIG. 6 is a flowchart of an example of a method in which a relay node uses control information to extract, from a block of data, a data stream for each of a plurality of UE devices and transmits, to the plurality of UE devices via a broadcast transmission, the data stream for each of the plurality of UE devices.

FIG. 6 is a flowchart of an example of a method in which a relay node uses control information to extract, from a block of data, a data stream for each of a plurality of UE devices and transmits, to the plurality of UE devices via a broadcast transmission, the data stream for each of the plurality of UE devices. The method 600 begins at step 602 with receiving, at relay node 104, a block of data and control information. At step 604, relay node 104 uses the control information to extract a data stream, from the block of data, for each of UE devices 106, 108, 110. At step 606, relay node 104 assigns each data stream to one of a plurality of narrowband channels. At step 608, relay node 104 allocates a set of subcarriers to each of the plurality of narrowband channels. At step 610, relay node 104 transmits, to UE devices 106, 108, 110, resource assignment information. At step 612, relay node 104 transmits, to UE devices 106, 108, 110, a paging message. At step 614, relay node 104 transmits, to UE devices 106, 108, 110 via a broadcast transmission 114, the data stream for each of UE devices 106, 108, 110.

Figure 7:
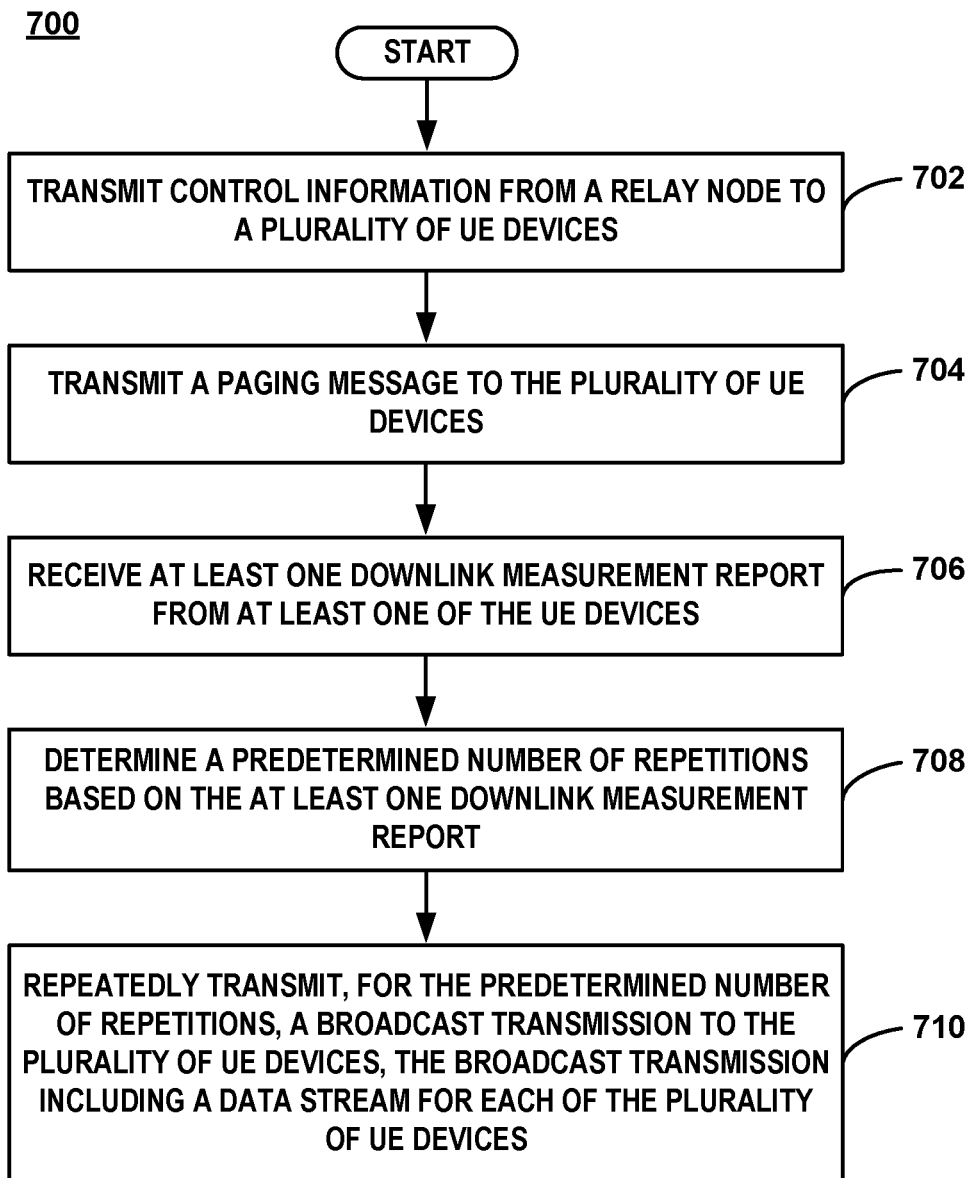
FIG. 7 is a flowchart of an example of a method in which a relay node repeatedly transmits, for a predetermined number of repetitions, a broadcast transmission to a plurality of UE devices. The broadcast transmission includes a data stream for each of the plurality of UE devices.

FIG. 7 is a flowchart of an example of a method in which a relay node repeatedly transmits, for a predetermined number of repetitions, a broadcast transmission to a plurality of UE devices. The broadcast transmission includes a data stream for each of the plurality of UE devices. The method 700 begins at step 702 with transmitting control information from relay node 104 to UE devices 106, 108, 110. At step 704, relay node 104 transmits a paging message to UE devices 106, 108, 110. At step 706, relay node 104 receives at least one downlink measurement report from at least one of UE devices 106, 108, 110. At step 708, relay node 104 determines a predetermined number of repetitions based on at least one downlink measurement report. At step 710, relay node 104 repeatedly transmits, for the predetermined number of repetitions, a broadcast transmission 114 to UE devices 106, 108, 110. The broadcast transmission 114 includes a data stream for each of UE devices 106, 108, 110.

Figure 8:
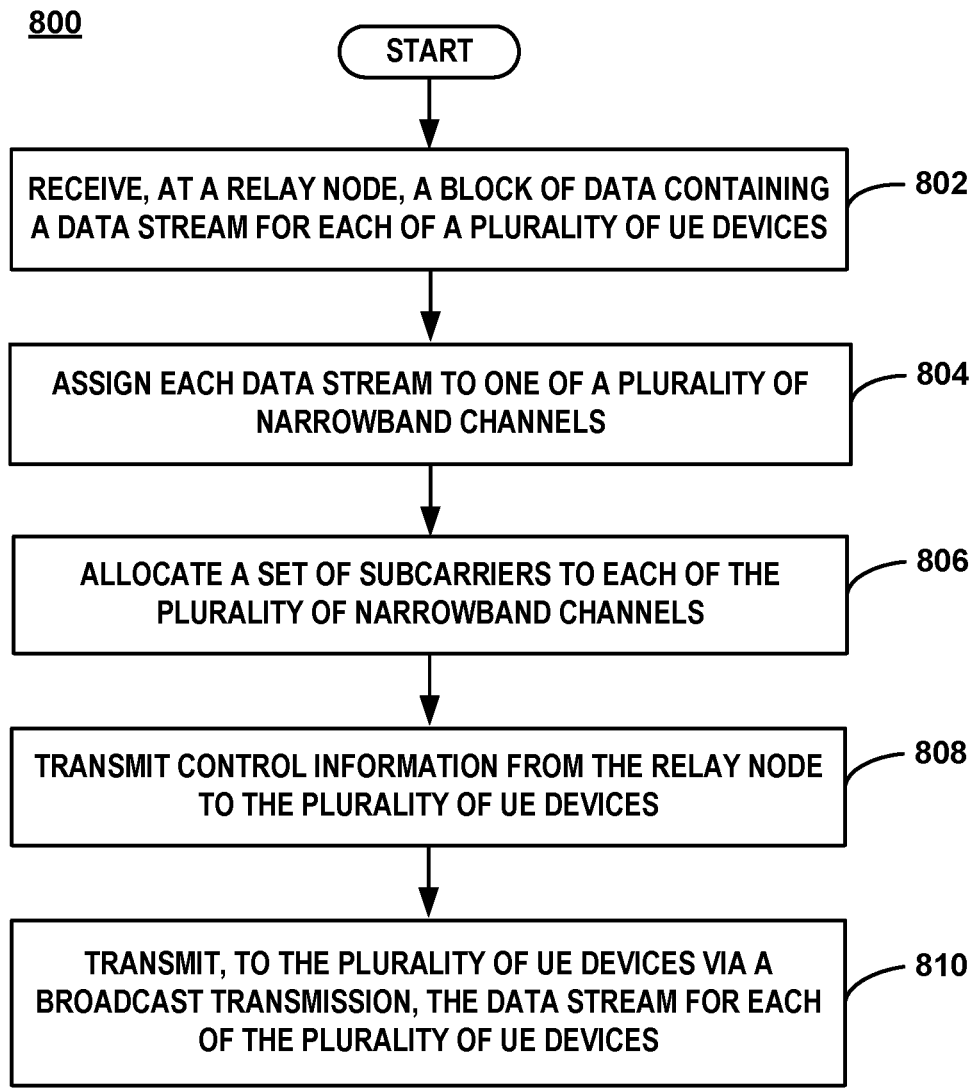
FIG. 8 is a flowchart of an example of a method in which a relay node transmits control information to a plurality of UE devices and transmits, to the plurality of UE devices via a broadcast transmission, a data stream for each of the plurality of UE devices.

FIG. 8 is a flowchart of an example of a method in which a relay node transmits control information to a plurality of UE devices and transmits, to the plurality of UE devices via a broadcast transmission, a data stream for each of the plurality of UE devices. The method 800 begins at step 802 with receiving, at relay node 104, a block of data containing a data stream for each of UE devices 106, 108, 110. At step 804, relay node 104 assigns each data stream to one of a plurality of narrowband channels. At step 806, relay node 104 allocates a set of subcarriers to each of the plurality of narrowband channels. At step 808, relay node 104 transmits control information to UE devices 106, 108, 110. At step 810, relay node 104 transmits a broadcast transmission 114 to UE devices 106, 108, 110. The broadcast transmission 114 includes a data stream for each of UE devices 106, 108, 110.

Figure 9:
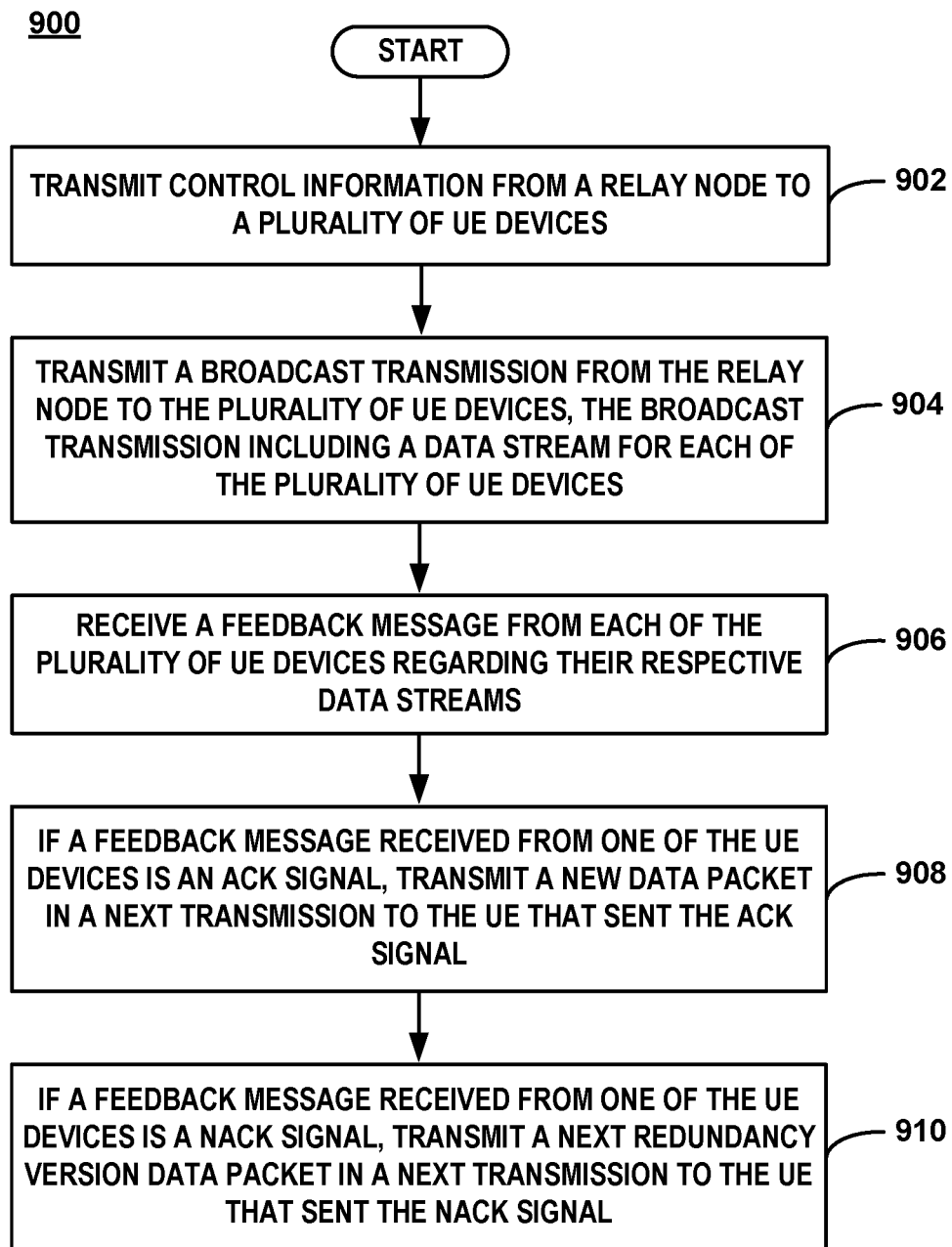
FIG. 9 is a flowchart of an example of a method in which a relay node transmits a broadcast transmission to a plurality of UE devices and receives a feedback message from each of the plurality of UE devices regarding their respective data streams.

FIG. 9 is a flowchart of an example of a method in which a relay node transmits a broadcast transmission to a plurality of UE devices and receives a feedback message from each of the plurality of UE devices regarding their respective data streams. The method 900 begins at step 902 with transmitting control information from relay node 104 to UE devices 106, 108, 110. At step 904, relay node 104 transmits a broadcast transmission 114 to UE devices 106, 108, 110. The broadcast transmission 114 includes a data stream for each of UE devices 106, 108, 110. At step 906, relay node 104 receives a feedback message from each of UE devices 106, 108, 110 regarding their respective data streams. At step 908, if the feedback message is an ACK signal, relay node 104 transmits a new data packet in the next transmission to the UE device that sent the ACK signal. At step 910, if the feedback message is a NACK signal, relay node 104 transmits a next Redundancy Version data packet in the next transmission to the UE device that sent the NACK signal.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at a relay node, a block of data and control information, the block of data containing a data stream for each of a plurality of user equipment (UE) devices;
   using the control information to extract, from the block of data, the data stream for each of the plurality of UE devices; and
   broadcasting a transmission comprising a plurality of narrowband channels such that each data stream, of the plurality of data streams, is transmitted in a different narrowband channel of the plurality of narrowband channels.

2. The method of claim 1, wherein the control information is a bitmap.

3. The method of claim 1, further comprising:
   transmitting a predetermined number of repetitions value to the plurality of UE devices; and
   repeatedly rebroadcasting the transmission for a predetermined number of repetitions indicated by the predetermined number of repetitions value.

4. The method of claim 1, further comprising:
   allocating a set of subcarriers to each narrowband channel of the plurality of narrowband channels such that each narrowband channel is allocated a different set of subcarriers.

5. The method of claim 1, further comprising:
   transmitting, to the plurality of UE devices, resource assignment information identifying resources assigned for transmitting each data stream in the broadcasted transmission.

6. The method of claim 1, further comprising:
   transmitting a paging message to the plurality of UE devices.

7. A relay node comprising:
   a receiver configured to receive a block of data and control information, the block of data containing a plurality of data streams, each data stream for each user equipment (UE) device of a plurality of user equipment (UE) devices;
   a controller configured to use the control information to extract, from the block of data, the plurality of data streams; and
   a transmitter configured to broadcast a transmission comprising a plurality of narrowband channels such that each data stream, of the plurality of data streams, is transmitted in a different narrowband channel of the plurality of narrowband channels.

8. The relay node of claim 7, wherein the control information is a bitmap.

9. The relay node of claim 7, wherein the transmitter is configured to:
   transmit a predetermined number of repetitions value to the plurality of UE devices; and repeatedly rebroadcast the transmission for a predetermined number of repetitions indicated by the predetermined number of repetitions value.

10. The relay node of claim 9, wherein the controller is further configured to determine the predetermined number of repetitions based on at least one downlink measurement report received from at least one of the plurality of UE devices.

11. The relay node of claim 7, wherein the controller is configured to allocate a set of subcarriers to each narrowband channel of the plurality of narrowband channels such that each narrowband channel is allocated a different set of subcarriers.

12. The relay node of claim 7, wherein the transmitter is further configured to transmit, to the plurality of UE devices, resource assignment information identifying resources assigned for transmitting each data stream in the broadcasted transmission.

13. The relay node of claim 7, wherein the transmitter is further configured to transmit a paging message to the plurality of UE devices.

14. The relay node of claim 7, wherein the transmitter is further configured to, in response to receipt of a negative-acknowledgment (NACK) feedback message from one of the plurality of UE devices, transmit a next Redundancy Version data packet to the UE device that sent the NACK feedback message.

15. The relay node of claim 14, wherein the next Redundancy Version data packet contains Hybrid Automatic Repeat Request (HARQ) process information, including a Redundancy Version (RV) value.

16. A relay node comprising:
a receiver configured to receive a multiplexed block of data and to receive control information, the multiplexed block of data comprising a first data stream for a first user equipment (UE) device and a second data stream for a second UE device;
a controller configured to apply the control information to:
extract the first data stream and the second data stream from the multiplexed data block,
assign the first data stream to a first narrow band channel, and
assign the second data stream to a second narrowband channel; and
a transmitter configured to broadcast a transmission comprising the first narrowband channel and the second narrowband channel, the first narrowband channel comprising the first data stream and the second narrowband channel comprising the second data stream.

* * * * *